United States Patent
Nonaka et al.

(10) Patent No.: US 8,600,535 B2
(45) Date of Patent: Dec. 3, 2013

(54) DEVICE FOR CALCULATING STANDARD WORK TIME, SYSTEM FOR MANAGING STANDARD WORK TIME, METHOD FOR CALCULATING STANDARD WORK TIME, AND PROGRAM THEREOF

(75) Inventors: Youichi Nonaka, Yokohama (JP); Makoto Ono, Yokohama (JP); Hisaya Ishibashi, Yokohama (JP); Attila Lengyel, San Jose, CA (US); Yuuichi Suginishi, Fujisawa (JP); Tomotoshi Ishida, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 13/131,141

(22) PCT Filed: Nov. 4, 2009

(86) PCT No.: PCT/JP2009/068795
§ 371 (c)(1),
(2), (4) Date: Jul. 21, 2011

(87) PCT Pub. No.: WO2010/061716
PCT Pub. Date: Jun. 3, 2010

(65) Prior Publication Data
US 2011/0276162 A1 Nov. 10, 2011

(30) Foreign Application Priority Data
Nov. 26, 2008 (JP) .................................. 2008-300781

(51) Int. Cl.
*G06F 19/00* (2011.01)
(52) U.S. Cl.
USPC ............................. 700/100; 382/124; 717/101
(58) Field of Classification Search
USPC ............................. 700/100; 382/124; 717/101
See application file for complete search history.

(56) References Cited

U.S. PATENT DOCUMENTS

| 5,479,343 A * | 12/1995 | Matoba et al. ................. 700/106 |
| 6,393,455 B1 | 5/2002 | Eilert et al. |
| 2002/0065704 A1 * | 5/2002 | Wada et al. ........................ 705/9 |

(Continued)

FOREIGN PATENT DOCUMENTS

| JP | 07-028896 | 1/1995 |
| JP | 2007-140625 | 6/2007 |
| JP | 2007-188306 | 7/2007 |
| JP | 2008-152312 | 7/2008 |

OTHER PUBLICATIONS

JP Notification of Reasons for Refusal for Japanese Patent Application No. 2008-300781, issued on Mar. 12, 2013.

*Primary Examiner* — Mohammad Ali
*Assistant Examiner* — Anthony Whittington
(74) *Attorney, Agent, or Firm* — Antonelli, Terry, Stout & Kraus, LLP.

(57) ABSTRACT

Disclosed are a device, a system, and a method for setting standard work times that take real-world manufacturing capabilities into account. Provided is a standard work time calculation device (10), which analyzes fluctuations in production line assessment indices on a per time period basis, and computes standard work times for each region, as classified according to the degree of fluctuation. The standard work time calculation device (10) comprises a fluctuation coefficient computation unit (111), which computes coefficients of fluctuation for the assessment indices, a fluctuation region identification unit (112), which identifies regions of fluctuation with coefficients of fluctuation that are greater than or equal to predetermined thresholds, and a standard work time computation unit (113), which computes standard work times for regions of fluctuation.

9 Claims, 13 Drawing Sheets

(56) References Cited

U.S. PATENT DOCUMENTS

| | | | |
|---|---|---|---|
| 2003/0169909 A1* | 9/2003 | Yamagishi | 382/124 |
| 2004/0193291 A1* | 9/2004 | Sakai | 700/28 |
| 2008/0104543 A1* | 5/2008 | Yokohari et al. | 715/810 |
| 2010/0162200 A1* | 6/2010 | Kamiyama et al. | 717/101 |

\* cited by examiner

FIG. 2

| PROCESS<br>PRODUCT NO. | ITEM NO. | 1<br>MEMBER INPUT | 2<br>PUNCHING | 3<br>CUTTING | 4<br>DELIVERY | 5<br>WELDING | ... |
|---|---|---|---|---|---|---|---|
| S01 | 1 | JULY 1ST<br>9:00 ~ 9:15 | JULY 1ST<br>9:15 ~ 10:45 | JULY 1ST<br>10:45 ~ 13:30 | JULY 1ST<br>10:45 ~ 13:30 | JULY 1ST<br>13:30 ~ 15:00 | ... |
| S01 | 2 | JULY 1ST<br>9:20 ~ 9:30 | JULY 1ST<br>9:30 ~ 11:50 | JULY 1ST<br>11:50 ~ 14:30 | JULY 1ST<br>14:30 ~ 15:05 | JULY 1ST<br>15:05 ~ 16:45 | ... |
| S01 | 3 | JULY 1ST<br>9:00 ~ 9:15 | JULY 1ST<br>9:15 ~ 10:45 | JULY 1ST<br>10:45 ~ 13:30 | JULY 1ST<br>13:30 ~ 13:55 | | ... |
| S02 | 7 | JULY 1ST<br>9:20 ~ 9:30 | JULY 1ST<br>9:30 ~ 11:50 | JULY 1ST<br>11:50 ~ 14:30 | JULY 1ST<br>14:30 ~ 15:05 | | ... |
| S03 | 9 | JULY 1ST<br>9:30 ~ 9:45 | JULY 1ST<br>13:00 ~ 14:45 | JULY 1ST<br>15:00 ~ 18:00 | JULY 2ND<br>9:00 ~ 9:20 | JULY 2ND<br>9:20 ~ 11:05 | ... |
| ... | ... | ... | ... | ... | ... | ... | |

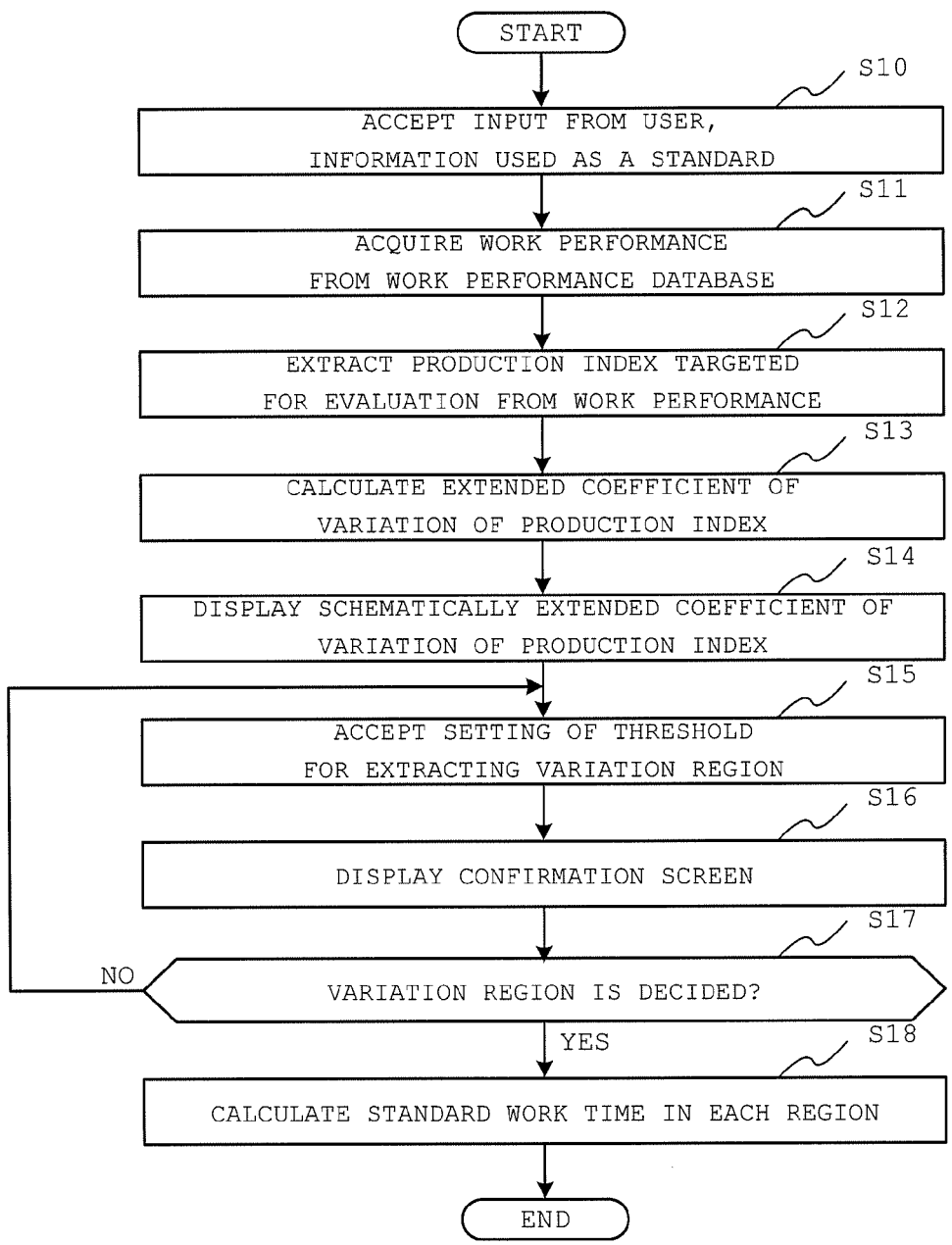

FIG. 4

| PROCESS | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MONTH | DATE | MEMBER DISCHARGE | PUNCHING | CUTTING | DELIVERY | WELDING | MEMBER ASSEMBLING | DELIVERY | PARTIAL COATING | DELIVERY | ASSEMBLING | DELIVERY | TESTING | DELIVERY | PACKAGING FOR SHIPMENT | DELIVERY |
| 7 | 1 | 5 | 6 | 5 | 5 | 5 | 4 | 4 | 6 | 4 | 6 | 4 | 5 | 4 | 5 | 4 |
| 7 | 2 | 6 | 5 | 5 | 6 | 6 | 5 | 5 | 4 | 4 | 6 | 6 | 5 | 6 | 5 | 5 |
| 7 | 3 | 5 | 6 | 6 | 5 | 5 | 5 | 5 | 6 | 5 | 6 | 6 | 4 | 6 | 4 | 4 |
| 7 | 4 | 6 | 5 | 5 | 5 | 6 | 4 | 5 | 6 | 5 | 6 | 5 | 5 | 4 | 5 | 5 |
| 7 | 5 | 8 | 5 | 6 | 5 | 6 | 5 | 4 | 6 | 4 | 6 | 5 | 5 | 6 | 5 | 6 |
| 7 | 6 | 7 | 8 | 5 | 5 | 5 | 4 | 5 | 6 | 5 | 6 | 5 | 5 | 6 | 6 | 5 |
| 7 | 7 | 8 | 8 | 9 | 10 | 6 | 6 | 5 | 6 | 4 | 5 | 5 | 4 | 4 | 5 | 4 |
| 7 | 8 | 6 | 9 | 6 | 8 | 8 | 10 | 5 | 4 | 6 | 6 | 5 | 5 | 6 | 5 | 5 |
| 7 | 9 | 5 | 5 | 9 | 9 | 6 | 11 | 11 | 6 | 5 | 5 | 5 | 5 | 4 | 4 | 6 |
| 7 | 10 | 6 | 5 | 9 | 10 | 9 | 10 | 12 | 9 | 10 | 6 | 4 | 4 | 6 | 5 | 5 |
| 7 | 11 | 6 | 6 | 5 | 11 | 10 | 9 | 13 | 8 | 10 | 8 | 9 | 4 | 4 | 4 | 4 |
| 7 | 12 | 5 | 5 | 5 | 5 | 9 | 10 | 10 | 9 | 9 | 7 | 8 | 10 | 7 | 5 | 5 |
| 7 | 13 | 6 | 6 | 6 | 5 | 6 | 9 | 9 | 8 | 8 | 8 | 9 | 10 | 8 | 9 | 6 |
| 7 | 14 | 6 | 5 | 5 | 5 | 5 | 10 | 11 | 9 | 7 | 7 | 9 | 9 | 7 | 9 | 10 |
| 7 | 15 | 5 | 6 | 6 | 5 | 6 | 6 | 12 | 8 | 10 | 9 | 8 | 8 | 9 | 8 | 12 |
| 7 | 16 | 5 | 5 | 5 | 5 | 6 | 5 | 5 | 9 | 9 | 7 | 7 | 6 | 8 | 9 | 10 |
| 7 | 17 | 6 | 6 | 6 | 5 | 5 | 6 | 5 | 7 | 10 | 8 | 9 | 9 | 9 | 10 | 9 |
| 7 | 18 | 5 | 5 | 5 | 5 | 6 | 5 | 5 | 6 | 9 | 7 | 8 | 10 | 10 | 9 | 8 |
| 7 | 19 | 6 | 6 | 5 | 5 | 6 | 4 | 5 | 4 | 4 | 6 | 4 | 12 | 11 | 7 | 7 |
| 7 | 20 | 5 | 5 | 5 | 5 | 5 | 5 | 4 | 6 | 4 | 6 | 5 | 4 | 10 | 11 | 9 |
| 7 | 21 | 6 | 5 | 6 | 5 | 6 | 6 | 5 | 4 | 5 | 5 | 5 | 5 | 4 | 9 | 8 |

FIG. 5

| MONTH | DATE | 1 MEMBER DISCHARGE | 2 PUNCHING | 3 CUTTING | 4 DELIVERY | 5 WELDING | 6 MEMBER ASSEMBLING | 7 DELIVERY | 8 PARTIAL COATING | 9 DELIVERY | 10 ASSEMBLING | 11 DELIVERY | 12 TESTING | 13 DELIVERY | 14 PACKAGING FOR SHIPMENT | 15 DELIVERY |
|---|---|---|---|---|---|---|---|---|---|---|---|---|---|---|---|---|
| | | | | | | | | PROCESS | | | | | | | | |
| 7 | 1 | 0.4 | 0.3 | 0.3 | 0.3 | 0.3 | 0.5 | 0.3 | 0.4 | 0.2 | 0.5 | 0.6 | 0.4 | 0.3 | 0.5 | 0.4 |
| 7 | 2 | 0.4 | 0.4 | 0.3 | 0.4 | 0.4 | 0.6 | 0.4 | 0.3 | 0.3 | 0.3 | 0.5 | 0.3 | 0.4 | 0.5 | 0.3 |
| 7 | 3 | 0.3 | 0.4 | 0.4 | 0.3 | 0.4 | 0.4 | 0.6 | 0.5 | 0.4 | 0.4 | 0.4 | 0.4 | 0.5 | 0.4 | 0.4 |
| 7 | 4 | 0.5 | 0.3 | 0.4 | 0.3 | 0.3 | 0.3 | 0.5 | 0.4 | 0.3 | 0.5 | 0.5 | 0.3 | 0.6 | 0.3 | 0.3 |
| 7 | 5 | 0.8 | 0.4 | 0.3 | 0.4 | 0.4 | 0.4 | 0.4 | 0.3 | 0.4 | 0.4 | 0.6 | 0.5 | 0.4 | 0.4 | 0.4 |
| 7 | 6 | 1.1 | 0.9 | 0.6 | 0.4 | 0.6 | 0.6 | 0.3 | 0.5 | 0.3 | 0.3 | 0.4 | 0.3 | 0.3 | 0.5 | 0.5 |
| 7 | 7 | 1.0 | 1.2 | 0.9 | 0.9 | 0.4 | 0.4 | 0.4 | 0.6 | 0.4 | 0.5 | 0.5 | 0.4 | 0.4 | 0.4 | 0.3 |
| 7 | 8 | 0.5 | 1.1 | 1.0 | 1.1 | 1.0 | 1.0 | 0.3 | 0.3 | 0.3 | 0.4 | 0.5 | 0.5 | 0.6 | 0.6 | 0.4 |
| 7 | 9 | 0.4 | 0.4 | 1.3 | 1.3 | 1.5 | 0.9 | 0.9 | 0.3 | 0.4 | 0.5 | 0.4 | 0.4 | 0.4 | 0.5 | 0.3 |
| 7 | 10 | 0.4 | 0.3 | 1.1 | 0.8 | 1.2 | 1.1 | 1.0 | 1.1 | 0.9 | 0.9 | 0.5 | 0.3 | 0.3 | 0.3 | 0.5 |
| 7 | 11 | 0.5 | 0.4 | 0.3 | 0.8 | 0.9 | 1.0 | 0.9 | 1.2 | 0.9 | 1.1 | 1.3 | 0.4 | 0.5 | 0.4 | 0.4 |
| 7 | 12 | 0.2 | 0.3 | 0.3 | 0.4 | 0.7 | 1.2 | 1.0 | 1.0 | 1.0 | 1.2 | 1.1 | 1.1 | 0.9 | 0.5 | 0.3 |
| 7 | 13 | 0.3 | 0.4 | 0.4 | 0.6 | 1.1 | 1.5 | 0.9 | 0.9 | 1.1 | 1.0 | 0.9 | 1.1 | 1.0 | 0.6 | 0.4 |
| 7 | 14 | 0.4 | 0.3 | 0.3 | 0.3 | 0.2 | 1.4 | 1.1 | 1.1 | 0.9 | 1.1 | 1.1 | 1.3 | 1.1 | 1.1 | 1.0 |
| 7 | 15 | 0.7 | 0.4 | 0.5 | 0.4 | 0.3 | 0.6 | 1.0 | 1.0 | 1.0 | 1.3 | 1.2 | 1.4 | 1.2 | 1.5 | 0.9 |
| 7 | 16 | 0.6 | 0.6 | 0.4 | 0.5 | 0.2 | 0.4 | 0.4 | 1.3 | 1.2 | 1.1 | 1.3 | 1.3 | 1.1 | 1.1 | 0.8 |
| 7 | 17 | 0.4 | 0.5 | 0.3 | 0.6 | 0.5 | 0.3 | 0.3 | 1.2 | 1.1 | 1.0 | 1.1 | 1.1 | 0.9 | 0.9 | 1.0 |
| 7 | 18 | 0.6 | 0.6 | 0.6 | 0.5 | 0.4 | 0.4 | 0.4 | 0.4 | 0.9 | 0.9 | 1.2 | 1.0 | 1.0 | 0.8 | 1.1 |
| 7 | 19 | 0.4 | 0.7 | 0.7 | 0.6 | 0.5 | 0.5 | 0.4 | 0.3 | 0.3 | 0.3 | 0.6 | 1.4 | 1.1 | 1.1 | 1.2 |
| 7 | 20 | 0.3 | 0.6 | 0.6 | 0.4 | 0.6 | 0.4 | 0.5 | 0.4 | 0.4 | 0.4 | 0.4 | 0.5 | 1.3 | 1.2 | 1.1 |
| 7 | 21 | 0.5 | 0.5 | 0.6 | 0.5 | 0.4 | 0.6 | 0.4 | 0.3 | 0.5 | 0.5 | 0.5 | 0.3 | 0.4 | 1.1 | 1.0 |

FIG. 6

| THRESHOLD | 0.8 |

FIG. 7

| PROCESS MONTH | DATE | 1 MEMBER DISCHARGE | 2 PUNCHING | 3 CUTTING | 4 DELIVERY | 5 WELDING | 6 MEMBER ASSEMBLING | 7 DELIVERY | 8 PARTIAL COATING | 9 DELIVERY | 10 ASSEMBLING | 11 DELIVERY | 12 TESTING | 13 DELIVERY | 14 PACKAGING FOR SHIPMENT | 15 DELIVERY |
|---|---|---|---|---|---|---|---|---|---|---|---|---|---|---|---|---|
| 7 | 1 | 0.4 | 0.3 | 0.3 | 0.3 | 0.3 | 0.5 | 0.3 | 0.4 | 0.2 | 0.5 | 0.6 | 0.4 | 0.3 | 0.5 | 0.4 |
| 7 | 2 | 0.4 | 0.4 | 0.3 | 0.4 | 0.4 | 0.6 | 0.4 | 0.3 | 0.3 | 0.3 | 0.5 | 0.3 | 0.4 | 0.5 | 0.3 |
| 7 | 3 | 0.3 | 0.4 | 0.4 | 0.3 | 0.4 | 0.4 | 0.6 | 0.5 | 0.4 | 0.4 | 0.4 | 0.4 | 0.5 | 0.4 | 0.4 |
| 7 | 4 | 0.5 | 0.3 | 0.4 | 0.3 | 0.3 | 0.3 | 0.5 | 0.4 | 0.3 | 0.5 | 0.5 | 0.3 | 0.6 | 0.3 | 0.3 |
| 7 | 5 | 0.8 | 0.4 | 0.3 | 0.4 | 0.4 | 0.4 | 0.4 | 0.3 | 0.4 | 0.4 | 0.6 | 0.5 | 0.4 | 0.4 | 0.4 |
| 7 | 6 | 1.1 | 0.9 | 0.6 | 0.4 | 0.6 | 0.6 | 0.3 | 0.5 | 0.3 | 0.3 | 0.4 | 0.3 | 0.3 | 0.5 | 0.5 |
| 7 | 7 | 1.0 | 1.2 | 0.9 | 0.9 | 0.4 | 0.4 | 0.4 | 0.6 | 0.4 | 0.5 | 0.5 | 0.4 | 0.4 | 0.4 | 0.3 |
| 7 | 8 | 0.5 | 1.1 | 1.0 | 1.1 | 1.0 | 1.0 | 0.3 | 0.3 | 0.3 | 0.4 | 0.5 | 0.5 | 0.6 | 0.6 | 0.4 |
| 7 | 9 | 0.4 | 0.4 | 1.3 | 1.3 | 1.5 | 0.9 | 0.9 | 0.3 | 0.4 | 0.5 | 0.4 | 0.4 | 0.4 | 0.5 | 0.3 |
| 7 | 10 | 0.4 | 0.3 | 1.1 | 0.8 | 1.2 | 1.1 | 1.0 | 1.1 | 0.9 | 0.9 | 0.5 | 0.3 | 0.3 | 0.3 | 0.5 |
| 7 | 11 | 0.5 | 0.4 | 0.3 | 0.8 | 0.9 | 1.0 | 0.9 | 1.2 | 0.9 | 1.1 | 1.3 | 0.4 | 0.5 | 0.4 | 0.4 |
| 7 | 12 | 0.2 | 0.3 | 0.3 | 0.4 | 0.7 | 1.2 | 1.0 | 1.0 | 1.0 | 1.2 | 1.1 | 1.1 | 0.9 | 0.5 | 0.3 |
| 7 | 13 | 0.3 | 0.4 | 0.4 | 0.6 | 1.1 | 1.5 | 0.9 | 0.9 | 1.1 | 1.0 | 0.9 | 1.1 | 1.0 | 0.6 | 0.4 |
| 7 | 14 | 0.4 | 0.3 | 0.3 | 0.3 | 0.2 | 1.4 | 1.1 | 1.1 | 0.9 | 1.1 | 1.1 | 1.3 | 1.1 | 1.1 | 1.0 |
| 7 | 15 | 0.7 | 0.4 | 0.5 | 0.4 | 0.3 | 0.6 | 1.0 | 1.0 | 1.0 | 1.3 | 1.2 | 1.4 | 1.2 | 1.5 | 0.9 |
| 7 | 16 | 0.6 | 0.6 | 0.4 | 0.5 | 0.2 | 0.4 | 0.4 | 1.3 | 1.2 | 1.1 | 1.3 | 1.3 | 1.1 | 1.1 | 0.8 |
| 7 | 17 | 0.4 | 0.5 | 0.3 | 0.6 | 0.5 | 0.3 | 0.3 | 1.2 | 1.1 | 1.0 | 1.1 | 1.1 | 0.9 | 0.9 | 1.0 |
| 7 | 18 | 0.6 | 0.6 | 0.6 | 0.5 | 0.4 | 0.4 | 0.4 | 0.4 | 0.9 | 0.9 | 1.2 | 1.0 | 1.0 | 0.8 | 1.1 |
| 7 | 19 | 0.4 | 0.7 | 0.7 | 0.6 | 0.5 | 0.5 | 0.4 | 0.3 | 0.3 | 0.3 | 0.6 | 1.4 | 1.1 | 1.1 | 1.2 |
| 7 | 20 | 0.3 | 0.6 | 0.6 | 0.4 | 0.6 | 0.4 | 0.5 | 0.4 | 0.4 | 0.4 | 0.4 | 0.5 | 1.3 | 1.2 | 1.1 |
| 7 | 21 | 0.5 | 0.5 | 0.6 | 0.5 | 0.4 | 0.6 | 0.4 | 0.3 | 0.5 | 0.5 | 0.5 | 0.3 | 0.4 | 1.1 | 1.0 |

FIG. 8

| | 1 | 2 | 3 | 4 | 5 |
|---|---|---|---|---|---|
| PROCESS → | MEMBER DISCHARGE | PUNCHING | CUTTING | DELIVERY | WELDING |
| ITEM NO. ↓ | | | | | |
| 1 | JULY 5$^{TH}$ 9:00 ~ 9:15 | JULY 6$^{TH}$ 9:20 ~ 9:45 | JULY 7$^{TH}$ 10:45 ~ 13:30 | JULY 7$^{TH}$ 10:45 ~ 13:30 | JULY 8$^{TH}$ 13:30 ~ 15:00 |
| 2 | JULY 5$^{TH}$ 9:05 ~ 9:30 | JULY 6$^{TH}$ 9:30 ~ 9:55 | JULY 7$^{TH}$ 11:50 ~ 14:30 | JULY 7$^{TH}$ 14:30 ~ 15:05 | JULY 8$^{TH}$ 15:05 ~ 16:45 |
| 3 | JULY 6$^{TH}$ 9:00 ~ 9:20 | JULY 7$^{TH}$ 9:20 ~ 9:55 | JULY 7$^{TH}$ 14:30 ~ 15:15 | JULY 8$^{TH}$ 10:30 ~ 11:15 | JULY 9$^{TH}$ 9:30 ~ 11:00 |
| 4 | JULY 6$^{TH}$ 9:10 ~ 9:25 | JULY 7$^{TH}$ 10:30 ~ 11:10 | JULY 8$^{TH}$ 13:50 ~ 14:30 | JULY 8$^{TH}$ 13:30 ~ 14:05 | JULY 9$^{TH}$ 13:05 ~ 14:45 |
| 5 | JULY 7$^{TH}$ 9:10 ~ 9:20 | JULY 7$^{TH}$ 13:00 ~ 13:45 | JULY 8$^{TH}$ 15:00 ~ 16:00 | JULY 8$^{TH}$ 15:00 ~ 15:40 | JULY 10$^{TH}$ 9:20 ~ 11:00 |

WORK PERFORMANCE DATA IN IDENTIFIED REGION

FIG. 9

| STANDARD WORK TIME IN IDENTIFIED REGION | | | | | |
|---|---|---|---|---|---|
| PROCESS | 1 MEMBER DISCHARGE | 2 PUNCHING | 3 CUTTING | 4 DELIVERY | 5 WELDING |
| STANDARD WORK TIME | 16.3 | 29.3 | 94.2 | 32.6 | 108.6 |
| STANDARD DEVIATION | 10.3 | 5.3 | 9.2 | 15.3 | 23.9 |

DEVICE FOR CALCULATING STANDARD WORK TIME, SYSTEM FOR MANAGING STANDARD WORK TIME, METHOD FOR CALCULATING STANDARD WORK TIME, AND PROGRAM THEREOF

TECHNICAL FIELD

The present invention relates to a technique to manage a standard work time in a production line.

BACKGROUND ART

A production line for a product that is manufactured undergoing multiple processes is designed to avoid occurrence of surplus or slowdown of production, in order to enhance overall production efficiency.

A standard work time is one of basic information used for designing the process and giving an operating instruction in the production line as described above. The standard work time indicates a work time that is used by a worker having an average proficiency level, who performs the operation with normal effort under a standard working condition. A setting value of the standard work time has considerable influence on production efficiency in the production line, and therefore, setting an appropriate value is an essential element in establishing the production line.

In general, there are methods for calculating the standard work time such as: Work Sampling method for categorizing intermittent actions into operations so as to modify the actions to standard values (perform rating); Predetermined Time Standards method for segmentalizing human operations into standard actions and applying a predetermined time value to each of the basic actions; and Method-Time Measurement method for converting a size of the basic action, based on a moved distance or a degree of difficulty.

For example, a technique described in the patent document 1 is known as a method for actually utilizing the standard work time that is calculated according to the aforementioned methods.

PRIOR ART DOCUMENT

Patent Document
[Patent Document 1]
U.S. Pat. No. 6,393,455

SUMMARY OF THE INVENTION

Problem to be Solved by the Invention

In the technique described in the patent document 1, there is prepared in advance a database which registers a relationship between an elemental work and a standard work time in each process. When a new process is designed in the production line, the database is searched for an operation that fits the best the description of the elemental work included in the new process, thereby enabling automatic setting of the standard work time.

However, there has been a problem inherently that the standard work time calculated according to the above method does not consider variation factors, notably such as a difference in workers' individual skills and busyness level, and therefore, there is seen an alienation between the planned production capability and an actual production capability. Therefore, it has been difficult to set a standard work time appropriate for the actual production capability, even by the method described in the patent document 1 which utilizes the database made of such data as mentioned above.

An object of the present invention is to provide a technique which calculates a standard work time which considers variations in a production index based on an actual execution status, thereby enabling establishment of a production plan with high precision.

Means to Solve the Problem

In order solve the problem above, the present invention provides a technique in which a production line is segmented by period and process being predetermined, and a standard work time is calculated for a region where variation of a predetermined evaluation index in each segment is equal to or higher than a predetermined threshold. By way of example, a standard work time calculation device relating to the present invention is a device for calculating a standard work time of a production line made up of multiple processes, includes a storage section for storing information indicating a work time for each of the processes constituting the production line, and information indicating a production index for each segment, being divided by period and process, and a controller for calculating a standard deviation, an average, and a variation coefficient obtained by dividing the standard deviation by the average, in a range including multiple periods, as to each of the production index calculated for each of the segment, identifying a variation region made up of the segment having the variation coefficient equal to or higher than the predetermined threshold, and calculating from the information indicating the work time, a standard work time in the period and in the process specified by the segment constituting the variation region.

Effect of the Invention

As described above, according to the present invention, it is possible to provide a technique which enables setting of the standard work time, more appropriate for a working situation of the production line.

BRIEF DESCRIPTION OF DRAWINGS

FIG. 2 is a schematic diagram of a work performance table that records a work start time and a work end time in each of the processes, with respect to each number of product (order number and product number) and item number (part number);

FIG. 3 is a flow diagram showing a processing flow in the standard work time calculation device 10;

FIG. 4 is a schematic diagram of an evaluation index table;

FIG. 5 is a schematic diagram of a variation coefficient table;

FIG. 6 is a schematic diagram showing threshold information;

FIG. 7 is a schematic diagram of the variation coefficient table in which a display mode of the variation region is changed;

FIG. 8 is a table that extracts a range corresponding to the variation region, from the work performance table;

FIG. 9 is a schematic diagram showing the standard work time table;

MODE FOR CARRYING OUT THE INVENTION

Hereinafter, the best mode for carrying out the present invention will be explained with reference to the accompanying drawings.

Figure 1:
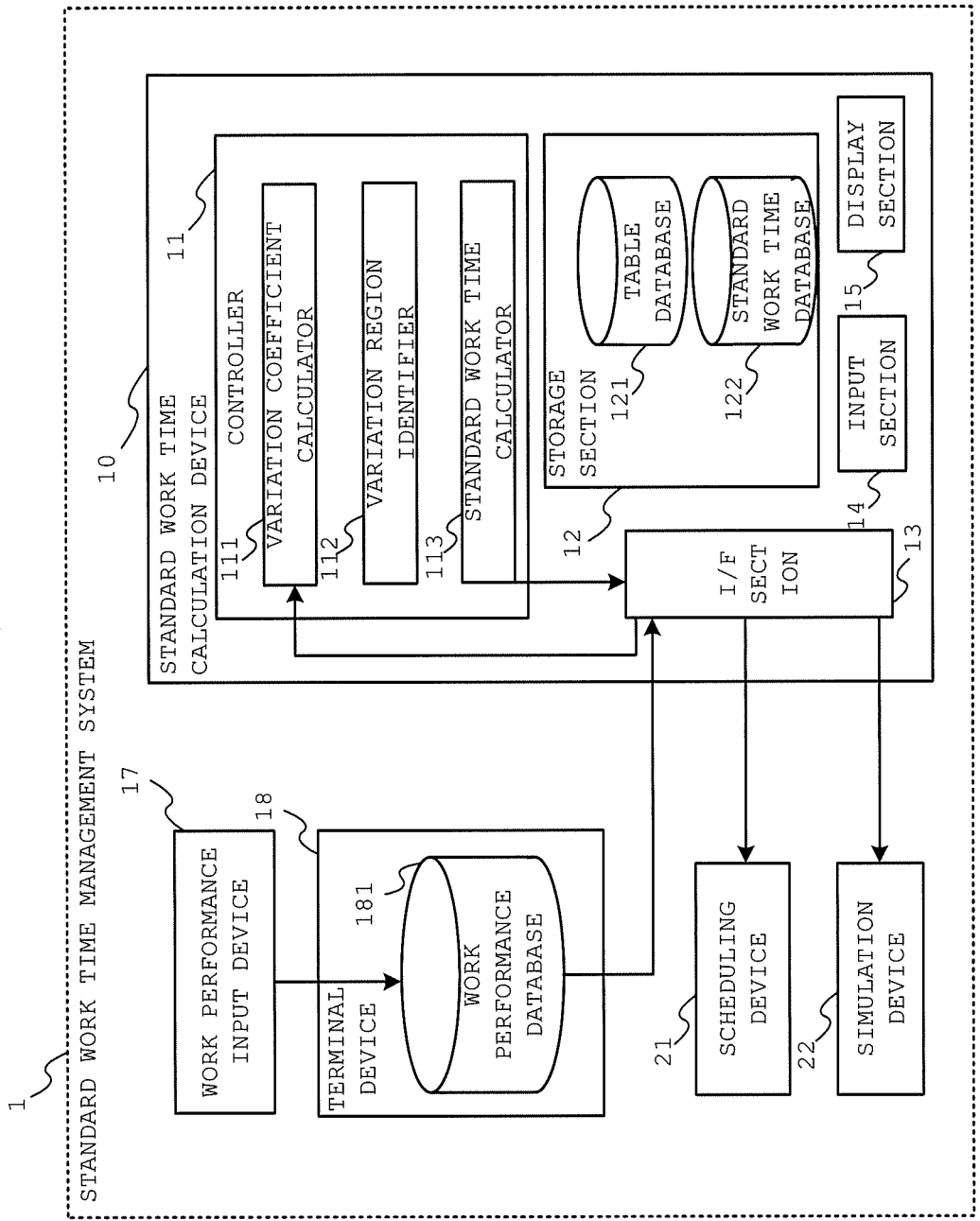
FIG. 1 is a block diagram showing a functional configuration of a standard work time management system relating to a first embodiment of the present invention.

FIG. 1 is a block diagram showing a functional configuration of the standard work time management system 1 relating to the first embodiment of the present invention.

As illustrated, the standard work time management system 1 incorporates a standard work time calculation device 10 for calculating a standard work time based on work performance of a production line, a terminal device 18 for supplying the work performance to the standard work time calculation device 10, a work performance input device 17 for inputting the work performance to the terminal device 18, a scheduling device 21 for performing a scheduling of the production line, and a simulation device 22 for performing a process design of the production line.

The terminal device 18 is, for instance, a server provided on a network and it collects work performance and accumulates data in a work performance database 181.

Specifically, when the terminal device 18 accepts the work performance of the production line inputted from the work performance input device 17 which will be described below, the terminal device 18 registers the work performance in the work performance database 181. There are recorded in the work performance database, for instance, information relating to a work time such as a work start time and a work end time, and information relating to a production index such as the number of product in process, a yield rate, an availability factor, a test accepted quantity, a test unaccepted quantity, in each of segments of the product line, being segmented by identifier of an article such as a product number and a part number, by predetermined period (date, or the like), by process, and the like.

There will be explained an example of the work performance which is accumulated in the work performance database 181 of the terminal device 18. The work performance may be illustrated as shown in FIG. 2, for instance.

FIG. 2 is an example of the work performance table which shows the date of the operation in each process, the work start time, and the work end time, with respect to each item number (part number). It is to be noted that in this example, the part number is shown in the vertical direction and the process is shown in the horizontal direction, and the operation date, the work start time, the work end time are recorded for each segment. The work performance table illustrates when a part specified by the item number (part number) entered each process (the work start time), when it went out (the work end time), and when the operation was performed (the date). It is to be noted here that the operation process is assumed as employing a job shop method, and each part enters the process and goes out from the process as planned.

In the present embodiment, an explanation will be made as to the case where only one unit of terminal device 18 manages the information of overall the production line. It is a matter of course that more than one terminal device 18 may be installed, in association with the number of the production lines.

The work performance input device 17 accepts an input of the work performance, and transmits the input to the terminal device 18. It is to be noted that more than one work performance input device 17 may be prepared for each process, for instance, and the terminal device 18 is allowed to accumulate information from multiple work performance input devices 17.

The scheduling device 21 is directed to the production line made up of multiple processes, and gives a manufacturing instruction to each of the processes constituting the production line, in response to a manufacturing order. By way of example, the scheduling device 21 designs a plan indicating when to start manufacturing a product, parts, and the like, in each of the processes constituting the production line, on the basis of the standard work time supplied from the standard work time calculation device 10.

The simulation device 22 verifies the capability of the production line. By way of example, the simulation device 22 calculates a simulation result of the production line, based on the standard work time supplied from the standard work time calculation device 10, a production volume in each of the process, a lead time between the processes, and the like, which are used as parameters for the simulation.

The standard work time calculation device 10 incorporates a controller 11, a storage section 12, an I/F section 13, an input section 14, and a display section 15.

The controller 11 incorporates a variation coefficient calculator 111 for calculating the variation coefficient from a targeted predetermined production index (referred to as "evaluation index"), a variation region identifier 112 for identifying the variation region having the variation coefficient equal to or higher than a predetermined threshold, and a standard work time calculator 113 for calculating the standard work time in the variation region.

Specifically, the variation coefficient calculator 111 calculates the variation coefficient based on the evaluation index, with respect to each period and process. It is to be noted that the variation which occurs in the production line is detected in the units of arbitrary period (moving average interval). The moving average interval will be explained later.

The variation region identifier 112 diagrammatically illustrates the region where the variation coefficient calculated by the variation coefficient calculator 111 is equal to or higher than the threshold, and decides the region where the evaluation index shows variation.

The standard work time calculator 113 calculates the standard work time as to each of the region with variation (the variation coefficient is equal to or higher than the threshold), and the region without variation (the variation coefficient is lower than the predetermined threshold), and stores the standard work time thus calculated in the standard work time database 122.

The storage section 12 incorporates a table database 121 and a standard work time database 122.

The table database 121 stores the work performance table acquired from the work performance database, an evaluation index table indicating the evaluation index of each segment obtained by dividing the production line by period and process, and a variation coefficient table indicating the variation coefficient of each segment. It is to be noted that those tables will be explained later.

The standard work time database 122 stores a standard work time table for each of the predetermined regions, calculated by the standard work time calculation device 10. The standard work time table will be explained later.

The I/F section 13 connects the standard work time calculation device 10 with other devices and a network, enabling data sending and receiving.

The input section 14 is a user interface to accept a manipulating instruction from a user.

The display section 15 displays an image or the like, which is generated to be shown for the user.

Figure 13:
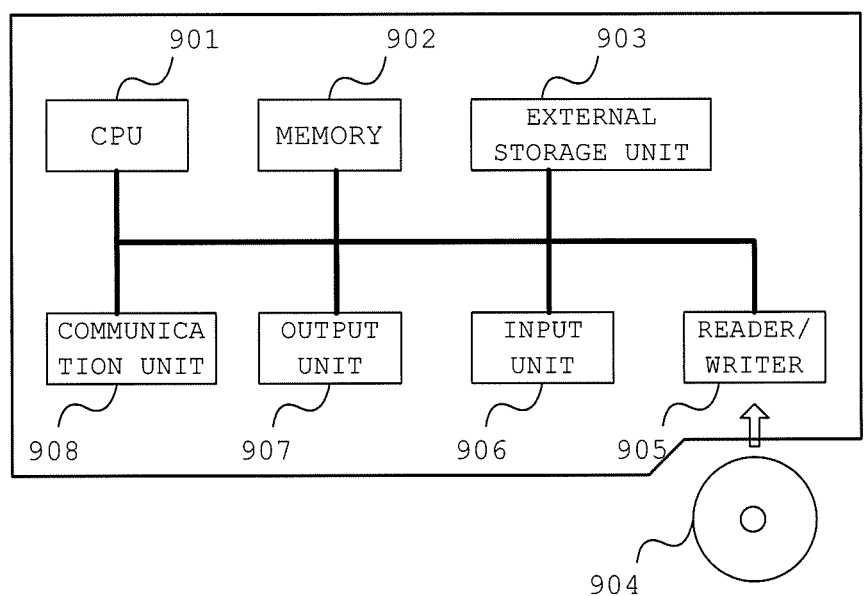
FIG. 13 is a block diagram showing en electrical configuration of the standard work time calculation device 10.

Here, there will be explained a hardware configuration of the standard work time calculation device 10. FIG. 13 is a block diagram showing an electrical configuration of the standard work time calculation device 10.

As shown in FIG. 13, the standard work time calculation device 10 is a general computer on which programs are operated, and it may be a personal computer, or a work station, for instance.

The standard work time calculation device 10 as described above may be implemented by a general computer 900, as shown in FIG. 13 (a schematic diagram of the computer 900), incorporating a CPU (Central Processing Unit) 901 serving as a primary part of the computer for integrally controlling each unit, a memory 902 for storing various data in rewritable manner, an external storage unit 903 made up of HDD (Hard Disk Drive) and the like, for storing various programs, data generated by the program, and the like, a reader/writer 905 for reading information from and writing information to a storage medium 904 with portability, such as CD-ROM (Compact Disk Read Only Memory) and DVD-ROM (Digital Versatile Disk Read Only Memory), an input unit 906 such as a keyboard, a mouse, and a touch panel, an output unit 907 such as a display, a communication unit 908 such as NIC (Network Interface Card) for establishing connection with the communication network.

By way of example, the storage section 12 may be implemented when the CPU 901 utilizes the memory 902 or the external memory storage unit 903, the controller 11 may be implemented when a predetermined program stored in the external memory storage unit 903 is loaded on the memory 902 and the CPU 901 executes the program, the input section 14 may be implemented when the CPU 901 utilizes the input unit 906, the display section 15 may be implemented when the CPU 901 utilizes the output unit 907, and the I/F section 13 may be implemented when the CPU 901 utilizes the communication unit 908.

This predetermined program may be downloaded on the external storage unit 903, from the storage medium 904 via the reader/writer 905, or from the network via the communication unit 908, and thereafter, loaded on the memory 902 to be executed by the CPU 901. In addition, the program may be directly loaded on the memory 902, from the storage medium 904 via the reader/writer 905, or from the network via the communication unit 908, and thereafter executed by the CPU 901.

With reference to the flow diagram shown in FIG. 3, an explanation will be made as to the processing of the standard work time calculation device 10 configured as described above according to the present embodiment.

Firstly, the variation coefficient calculator 111 of the standard work time calculation device 10 accepts an input of information that is used as a reference standard for calculating the standard work time (S10).

Specifically, the variation coefficient calculator 111 accepts instructions as to a predetermined range (period and process) of the production line segmented on the work performance table, and as to the production index (evaluation index) targeted for checking whether or not there is variation in this range. By way of example, a screen prompting for an instruction regarding the reference standard above is displayed on the display section 15, and accepts the instruction from the user via the input section 14.

Next, the variation coefficient calculator 111 acquires from the work performance database 181 of the terminal device 18, the work performance table which is based on the standard determined in the step 10 (S11). It is to be noted that the work performance table being obtained is registered in the table database 121.

The variation coefficient calculator 111 assumes that the work performance table is accumulated in advance in the work performance database 181. Following explanation will be made, assuming that the variation coefficient calculator 111 acquires the work performance table as illustrated in FIG. 2, for instance. It is also assumed that the variation coefficient calculator 111 receives in the step 10 as the reference standard, an instruction to check the variation of the number of work start (evaluation index) within the range of July 1 to July 21 (period) and the processes 1 to 15 (process).

Next, the variation coefficient calculator 111 detects the evaluation index from the work performance table, and generates and registers the evaluation index table (S12).

Specifically, the variation coefficient calculator 111 extracts the evaluation index, inhere, the number of work start in each of the processes, based on the work performance table. This can be represented by a table as shown in FIG. 4, for instance.

FIG. 4 is one example of the evaluation index table generated by the variation coefficient calculator 111 and registered in the table database 121. The evaluation index table of the present embodiment shows the period (date) in the vertical direction and the processes in the horizontal direction, and the number of work start, used as the evaluation index, is recorded in each of the segments. By way of example, it is found that the number of work start in July 1 for the "part discharge" is "5". It is to be noted that the number of work start being the evaluation index can be obtained by posting the number of work start by date, which is registered in the work performance table as shown in FIG. 2.

It is a matter of course that the evaluation index is not limited to the number of work start, but it is also applicable to any of the elements which may bring about a change in distribution of goods, such as the number of work completion, a device processing time, a production quantity, the number of in-process items, and a yield rate.

Furthermore, the variation coefficient calculator 111 calculates an extended coefficient of variation of the evaluation index (S13).

Specifically, the variation coefficient calculator 111 firstly uses formula 1 as shown below, to calculate an average value of the evaluation index during a certain period.

[Formula 1]

$$r_{ia} = \frac{1}{k} \sum_{j=a-k}^{a} p_{ij} \tag{1}$$

$r_{ia}$: Average value of production index from time $a-k$ to time $a$ in process $i$ $p_{ij}$: Produciton index in interval $j$ in process $i$ $i$: Process number($i = 1, 2, \ldots, n$)

$j$: Interval number($j = 1, 2, \ldots, a, \ldots$)

$k$: Moving average interval of production index $a$: Time(date)

The formula 1 obtains a moving average of the evaluation index during a certain period. In the example of FIG. 4, the process number i indicates "1 to 15" (number of processes), and the interval number j indicates "122" (date). It is to be noted here that the moving average interval k indicates a period for calculating the moving average. By way of example, if the moving average value at the point of July 10 is obtained assuming the moving average interval is one week (k=7), the average value of the evaluation index for one week immediately before and on July 10th (from July 3rd to July 10th) is obtained. Therefore, in the case where the moving average is obtained targeting the evaluation index of July 10th to July 15th, the average values are calculated respectively for one week immediately before and on each of the above dates (from July 3rd to July 10th, from July 4th to July 11th, from July 5th to July 12th, and so on).

It is to be noted here that a date is used as the clock time, and a week is used as the moving average interval, but any time units (year, month, day, hour, minute, second, or the like) may be applicable.

Next, the variation coefficient calculator 111 uses the following formula 2 to obtain a standard deviation.

[Formula 2]

$$s_{ia} = \sqrt{\frac{1}{k} \sum_{j=a-k}^{a} (p_{ij} - r_{ia})^2} \quad (2)$$

$s_{ia}$: Standard deviation of production index $p_{ij}$ in moving average interval $k$ at time $a$ in process $i$ $r_{ia}$: Average value of production index from time $a$-$k$ to time $a$ in process $i$ $p_{ij}$: Production index in interval $j$ in process $i$ $i$: Process number($i$ = 1, 2, ... , $n$)

$j$: Interval number($j$ = 1, 2, ... , $a$, ... )

$k$: Moving average interval of production index $a$: Time(date)

The formula 2 is to obtain a square root of mobility statistics as to variance of the evaluation index; that is, to obtain the standard deviation in the aforementioned moving average interval k.

Then, the variation coefficient calculator 111 uses the following formula 3 to obtain an extended coefficient of variation, from the average value and the standard deviation of the evaluation index.

[Formula 3]

$$c_{ia} = \frac{s_{ia}}{r_{ia}} \quad (3)$$

$s_{ia}$: Standard deviation of production index $p_{ij}$ in moving average interval $k$ at time $a$ in process $i$ $r_{ia}$: Average value of production index from time $a$-$k$ to time $a$ in process $i$ The formula 3 is to obtain the mobility statistics of the variation coefficient, which is a ratio between the moving average and the standard deviation.

In here, the variation region identifier 112 generates a screen which diagrammatically illustrates each variation coefficient obtained by the variation coefficient calculator 111 as described above, and displays the screen on the display section 15 (S14).

By way of example, when the variation coefficient is calculated for the evaluation index table as shown in FIG. 4, a screen for displaying a variation coefficient table as shown in FIG. 5 is generated. FIG. 5 is an example of the variation coefficient table. The variation coefficient table of the present embodiment shows the period (date) in the vertical direction and the processes in the horizontal direction, and the extended coefficients of variation in the moving average interval are recorded in the segments respectively, with regard to the number of work start being the evaluation index. It is to be noted that the variation region identifier 122 stores the variation coefficient table being generated, into the table database 121.

Next, the variation region identifier 112 accepts from a user, a setting of a threshold for designating the variation region (S15).

Specifically, the user inputs the threshold via the input section 14 to set the threshold. In here, if the user knows a variation period of the evaluation index (e.g., a period when the evaluation index was drastically changed, such as the time of business prosperity, a trouble such as device failure, or the like), the user may be allowed to input as the threshold, a variation coefficient for the period and the process, which might cause the variation, with reference to the variation coefficient table as shown in FIG. 5.

Figure 6:
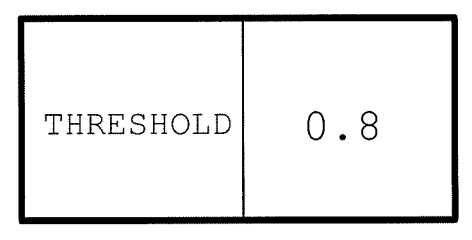

The variation region identifier 112 stores into the storage section 12, the threshold being set as described above, as the threshold information as shown in FIG. 6. It is to be noted that a predetermined threshold may be set in advance in the storage section 12, thereby allowing the user to use this predetermined threshold.

Upon accepting the setting of the threshold, the variation region identifier 112 identifies a segment (each segment is referred to as a cell) as the variation region, which includes the variation coefficient equal to or higher than the threshold, as to the variation coefficient table as shown in FIG. 5 described in the step 15, and generates a confirm screen showing the variation coefficient table whose display mode has been changed. Then, the variation region identifier 112 displays the confirmation screen on the display (S16).

FIG. 7 illustrates one example of the variation coefficient table in which the display mode of the variation region is changed. FIG. 7 shows an example of the confirmation screen on which the threshold is assumed as "0.8" to identify the variation region (a cell indicating a value equal to or higher than the threshold), based on the variation coefficient table as shown in FIG. 5, and the variation region is displayed in a highlighted color.

Next, the variation region identifier 112 accepts permission for fixing the variation region, from the user via the input section 14 (S17).

For example, the user refers to the variation coefficient table indicating the variation region which is displayed as the confirmation screen in the step 16, and determines whether or not the variation region is extracted appropriately and a desired result is obtained. If the variation region is appropriately extracted (Yes in S17), the user executes an operation for giving an instruction to confirm acceptance, via the input section 14. On the other hand, if the variation region is not extracted appropriately (No in S17), it is possible that the processing returns to the step 15 and setting of the threshold is performed again.

Here, variation of the evaluation index will be explained. As shown in FIG. 7, in the variation of the evaluation index, influences propagates with time, from an upstream process to a downstream process, and there is shown a characteristic that the variation region expands from the upstream to the downstream (referred to as "butterfly phenomenon"). In the example of FIG. 7, the variation occurred on July 5th in the first process "member carry-out" propagates to a subsequent process with time. In other words, variation of the evaluation index (e.g., a work-in-progress quantity, a produced quantity per unit time) of the production line propagates to the downstream process, resulting in influence on a production efficiency of the overall production line. On the other hand, it is also possible that variation occurs only in a particular cell or in the periphery thereof, if there is a periodic maintenance inspection or the like. The user checks the period when the variation was likely to occur actually and the variation region on the confirmation screen, and accordingly, the user is allowed to determine whether or not the variation is identified in a suitable manner.

It is further possible that the variation region identifier 112 determines whether or not the variation region on the confirmation screen has a shape showing the characteristic of the butterfly phenomenon (e.g., a shape being continuous from the upper left cell to the lower right cell), and then removes noise and the like in a region other than the region where the butterfly phenomenon occurs.

As a method for executing the processing as described above, for instance, the variation region identifier 112 firstly decides a cell serving as a reference standard, out of the cells where the variation is shown, and checks the variation coefficient of the left, upper, and upper-left cells which come into contact with the cell as the standard. When two or more variation coefficients in the cells are equal to or higher than the threshold, out of the three cells above, the variation region identifier 112 determines that the cell as the standard and the cells being equal to or higher than the threshold among the three cells are influenced by the propagation from the upstream process; in other words, those cells indicate the butterfly phenomenon.

It is also possible to configure such that the variation region identifier 112 automatically readjusts the threshold, until there appears cells indicating the butterfly phenomenon, i.e., the variation region having the characteristic of the butterfly phenomenon.

Furthermore, the variation region identifier 112 is able to receive on the confirmation screen, a designation from the user that only a desired region is set as the variation region. By way of example, the variation region identifier 112 accepts the designation in the units of cell from the user via the input section 14, then the cells equal to or higher than the threshold are decided as the variation region, out of the cells within the region being designated, and the decided region is utilized in later processing.

When the variation region is decided, the standard work time calculator 113 calculates a standard work time with regard to the evaluation index, for the variation region (S18).

Specifically, the standard work time calculator 113 firstly extracts from the work performance table acquired in the step 11, information regarding the work time in the following ranges of the production line; the range specified by the cells in the variation region and the range specified by the cells in the region having the variation coefficient lower than the threshold.

By way of example, FIG. 8 shows a table when the work performance table for the variation region is extracted. This example shows that the standard work time calculator 113 extracts information regarding the work time in the range from the process 1 to process 5, in the period from July 5th to July 10th (period).

Next, the standard work time calculator 113 calculates the work time for each of the segments of the production line, being segmented by period and process. In here, the work time is figured out according to the work start time and the work end time.

Then, the standard work time calculator 113 calculates the standard work time that is an average obtained by dividing the total work time as to each process, by a work count. The standard work time calculator 113 further calculates a standard deviation in each process, generates the standard work time table, and stores the table in the standard work time database 122 in the storage section 12. FIG. 9 shows an example of the standard work time table. The standard work time table of the present example shows the standard work time and the standard deviation as to each of the processes 1 to 5 which correspond to the variation region (here, the period is assumed as from July 5th to July 10th (period) as shown in FIG. 8). It is to be noted that the standard work time table as described above is outputted to the scheduling device 21 and to the simulation device 22 as shown in FIG. 1.

The standard work time calculator 113 may further execute the same processing for the region having the variation coefficient lower than the threshold, generates the standard work time table showing the standard work time and the standard deviation as to each of the processes, and outputs the table to the scheduling device 21 and to the simulation device 22.

One embodiment of the present invention has been explained.

According to the embodiment described above, the standard work time calculation device 10 is able to calculate the standard work time in the region showing a certain level or higher variation in the evaluation index.

In addition, the state of distribution is made visible based on the evaluation indexes which fluctuate with each passing hour. Therefore, it is possible to easily specify what causes disturbance in the distribution and how the variation propagates subsequently. By designating the region as the variation region, a user is allowed to acquire the standard work time in the case where the same cause occurs. Accordingly, it is possible hereafter to design a production line which uses the standard work time appropriate for reality, according to the factors causing the distributional disturbance.

Next, with reference to the drawings, an explanation will be made as to an example where the present invention is applied to an actual production line to design a work plan.

Figure 10:
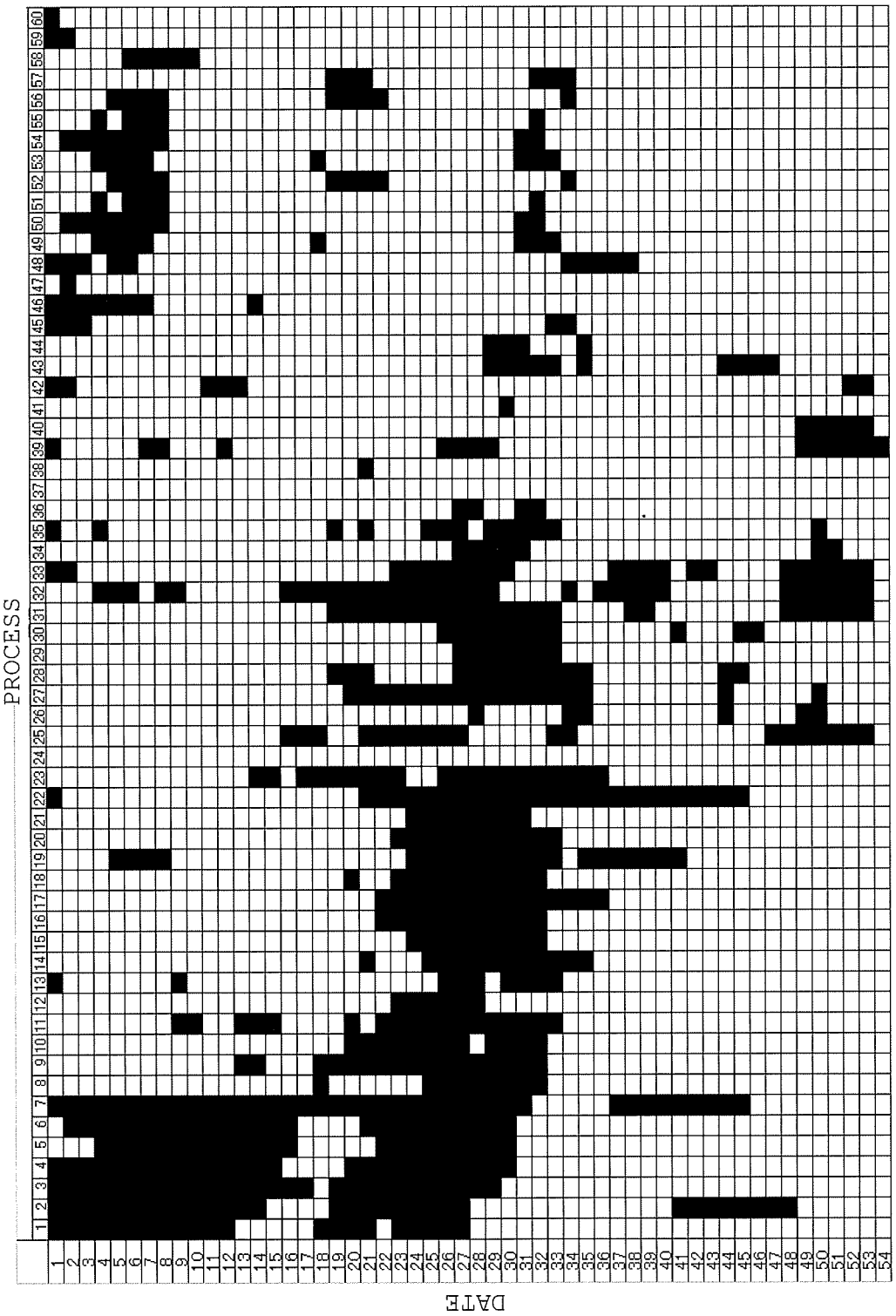
FIG. 10 is a schematic diagram showing a confirmation screen of the variation region.

FIG. 10 is a confirmation screen showing the variation region of the evaluation index in the production line made up of 60 processes. Here, the variation region is represented by black cells.

According to FIG. 10, the butterfly phenomenon appears in the processes from 1 to 7 during the period from date 1 to date 16, and in the processes from 1 to 36 during the period from date 18 to date 31. A primary reason of the butterfly phenomenon of these regions is caused by a large variation in frequency of member input in the process 1, around the date 1 and the date 18.

Figure 11:
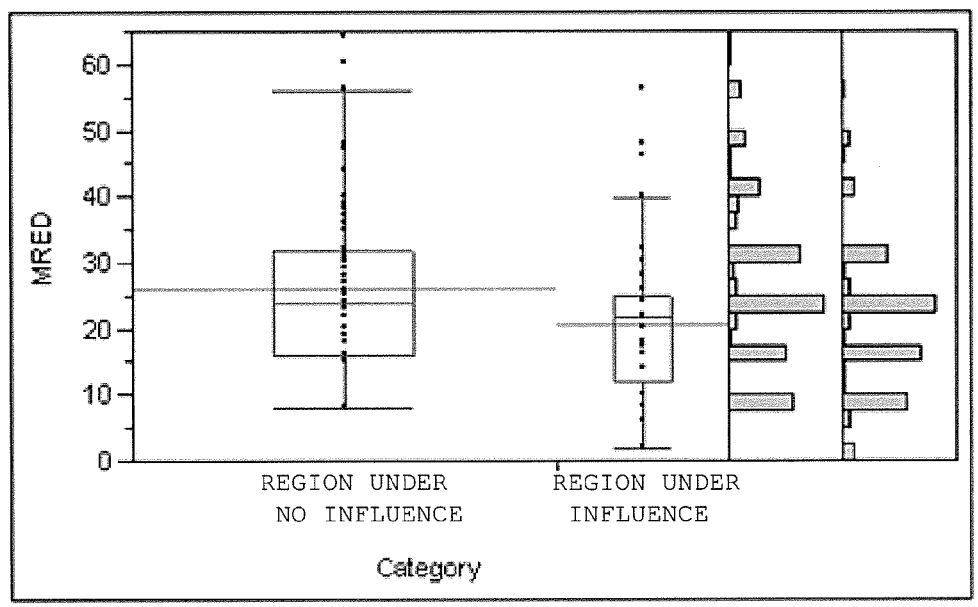
FIG. 11 is a box-and-whisker plot showing a dispersion of the standard work time.

FIG. 11 illustrates a result of analysis, which analyzes variances of manufacturing lead time, regarding the table which shows the variations as shown in FIG. 10.

FIG. 11 is a box-and-whisker plot showing in the vertical direction, a time difference compared to a conventional standard work time, and illustrating variance of the standard work time, as to the variation region (a region influenced by the butterfly phenomenon) and the region where the variation is lower than the threshold (a region not influenced by the butterfly phenomenon).

According to FIG. 11, there is an apparent difference between the standard work time in both regions, and the conventional standard work time without considering the actual status of the operational fluctuation. Furthermore, according to a result of F test in ANOVA (analysis of variance) which estimates whether a difference in the variance between both regions can be also determined as a difference in population variance, it is determined that there is a difference also in the population variance. Therefore, it is found significant to perform calculation of the standard work time, by dividing the regions into both categories.

Figure 12:
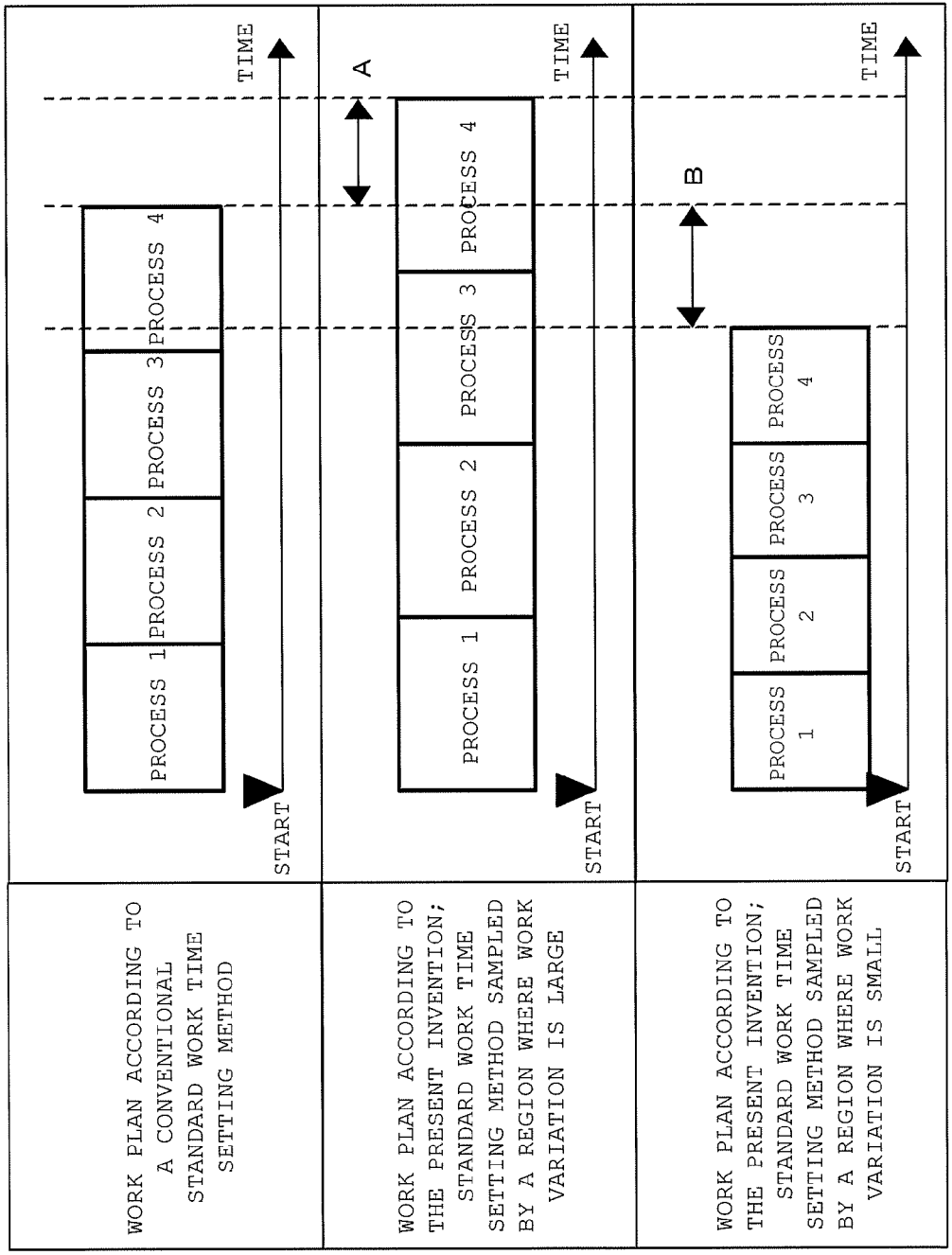
FIG. 12 is an example of a design result of a work plan according to a scheduling device 21.

FIG. 12 is one example of a design result of the work plan according to the scheduling device 21, based on the standard work time calculated by the standard work time calculation device 10 relating to the present invention. The upper row indicates a work plan according to a method for setting a conventional standard work time, the middle row indicates a work plan according to a method for setting the standard work time, being sampled in a region including a large variation in work (variation region), and the lower row indicates a work plan according to a method for setting the standard work time being sampled in a region including a small variation in work (a region with the variation coefficient lower than the threshold).

The work plan shown in the middle row is designed in such a manner that the time is longer by the amount of A than the work plan shown in the upper row. This is because, for instance, the region where the butterfly phenomenon occurs may generate a large error between the plan and the actual state, and therefore generous amount of allowance is estimated in each of the processes.

The work plan shown in the lower row is designed in such a manner that the time is shorter by the amount of B than the work plan shown in the uppermost row. This is because, for instance, the region with less variation has a high possibility that the operation proceeds as scheduled and less amount of allowance is estimated in each of the processes.

As discussed above, according to the present invention, the scheduling device and the simulation device use as input data, the standard work time categorized by the size of the variation coefficient, when a production line is established. Therefore, it is possible to design the production line, considering a period, an amount of variation, a cause, and the like, regarding the variation of the production index (evaluation index) targeted for evaluation in an actual production line, without restrained by a predetermined standard work time. Consequently, for instance, it is possible to improve the production index of the production line to be suitable for the reality, such as reducing a surplus production by setting production capabilities in each of continuous processes to the same level, and reducing slowdown of production by synchronizing the operations in respective processes, thereby enhancing a production efficiency of the overall production line.

It is to be noted that the application of the standard work time being calculated is not limited to the examples above, and it is applicable to various processing. It is further possible to configure such that the standard work time database 122 is stored in the terminal device 18, to supply the standard work time calculated by the standard work time calculation device 10 to another device on the network.

DENOTATION OF REFERENCE NUMERALS

1: STANDARD WORK TIME MANAGEMENT SYSTEM, 10: STANDARD WORK TIME CALCULATION DEVICE, 11: CONTROLLER, 111: VARIATION COEFFICIENT CALCULATOR, 112: VARIATION REGION IDENTIFIER, 113: STANDARD WORK TIME CALCULATOR, 12: STORAGE SECTION, 121: TABLE DATABASE, 122: STANDARD WORK TIME DATABASE, 13: I/O INTERFACE SECTION, 14: INPUT SECTION, 15: DISPLAY SECTION, 17: WORK PERFORMANCE INPUT DEVICE, 18: TERMINAL DEVICE, 181: WORK PERFORMANCE DATABASE, 21: SCHEDULING DEVICE, 22: SIMULATION DEVICE

What is claimed is:

1. A standard work time calculation device for calculating a standard work time in a production line comprising multiple processes, comprising,
    a storage section for storing information indicating a work time for each of the processes constituting the production line, and information indicating a production index for each segment being divided by period and process, and
    a controller for calculating a standard deviation, an average, and a variation coefficient obtained by dividing the standard deviation by the average, in a range including multiple periods, as to each of the production index calculated for each of the segment, identifying a variation region made of the segment having the variation coefficient equal to or higher than the predetermined threshold, and calculating from the information indicating the work time, a standard work time in the period and in the process specified by the segment constituting the variation region.

2. The standard work time calculation device according to claim 1, wherein,
    the variation region being identified indicates a continuous region having the variation coefficient being equal to or higher than the threshold, and the region propagating with time from an upper stream process to a lower stream process.

3. The standard work time calculation device according to claim 1, further comprising an input section and a display section, wherein,
    the controller displays on the display section, a confirmation screen for displaying the variation coefficient with respect to each of the segment, on a two-axial table showing the period on one axis and showing the process on the other axis,
    accepts a designation of the segment on the table via the input section, and
    identifies as the variation region, a region comprising the segment being designated.

4. The standard work time calculation device according to claim 3, wherein,
    the controller displays, on the table displayed in the confirmation screen, the segment having the variation coefficient equal to or higher than the threshold in a display mode being different from the display mode for another region.

5. The standard work time calculation device according to claim 1, wherein,
    the controller further calculates a standard work time of the region comprising the segment having the variation coefficient lower than the threshold.

6. The standard work time calculation device according to claim 1, wherein,
    the production index indicates any of the followings per unit time in each of the processes; the number of work start, the number of work completion, the number of in-process items, and a yield rate.

7. A standard work time calculation method of a standard work time calculation device for calculating a standard work time in a production line comprising multiple processes, the device executing the steps of;

storing information indicating a work time for each of the processes constituting the production line, and information indicating a production index for each segment being divided by period and process, calculating a standard deviation, an average, and a variation coefficient obtained by dividing the standard deviation by the average, in a range including multiple periods, as to each of the production index for each of the segment being divided by period and process, identifying a variation region comprising the segment having the variation coefficient equal to or higher than the predetermined threshold, and calculating from the information indicating the work time, a standard work time in the period and in the process specified by the segment constituting the variation region.

8. A program for allowing a computer to function as a standard work time calculation device for calculating a standard work time in a production line comprising multiple processes, the computer executing the steps of;

storing information indicating a work time for each of the processes constituting the production line, and information indicating a production index for each segment being divided by period and process, calculating a standard deviation, an average, and a variation coefficient obtained by dividing the standard deviation by the average, in a range including multiple periods, as to each of the production index for each of the segment divided by period and process, identifying a variation region comprising the segment having the variation coefficient equal to or higher than the predetermined threshold, and calculating from the information indicating the work time, a standard work time in the period and in the process specified by the segment constituting the variation region.

9. A standard work time management system for calculating a standard work time in a production line comprising multiple processes, comprising, a server for accumulating work performance including information indicating a work time for each of the processes constituting the production line, and information indicating a production index, and a standard work time calculation device for obtaining the work performance from the server, calculating the production index for each segment obtained by dividing the production line by period and process, based on the work performance, calculating a standard deviation, an average, and a variation coefficient obtained by dividing the standard deviation by the average, in a range including multiple periods, as to each of the production index calculated for each of the segment, identifying a variation region comprising the segment having the variation coefficient equal to or higher than the predetermined threshold, and calculating a standard work time in the period and in the process specified by the segment constituting the variation region, based on the information indicating the work time of the work performance.

* * * * *